United States Patent
Stark et al.

(10) Patent No.: US 11,586,185 B2
(45) Date of Patent: Feb. 21, 2023

(54) ENGINEERING SYSTEM FOR ORCHESTRATION OF AN INDUSTRIAL PLANT

(71) Applicant: ABB Schweiz AG, Baden (CH)

(72) Inventors: Katharina Stark, Weinheim (DE); Mario Hoernicke, Landau (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/353,834

(22) Filed: Jun. 22, 2021

(65) Prior Publication Data
US 2021/0397163 A1 Dec. 23, 2021

(30) Foreign Application Priority Data
Jun. 23, 2020 (EP) .................................... 20181797

(51) Int. Cl.
G05B 19/418 (2006.01)
(52) U.S. Cl.
CPC ... G05B 19/4188 (2013.01); G05B 19/41865 (2013.01); G05B 19/41885 (2013.01)
(58) Field of Classification Search
None
See application file for complete search history.

(56) References Cited

U.S. PATENT DOCUMENTS

| | | | | |
|---|---|---|---|---|
| 6,381,505 B1 * | 4/2002 | Kassmann | ............ | G05B 13/048 703/2 |
| 7,194,318 B2 * | 3/2007 | Attarwala | ............ | G05B 13/048 703/2 |
| 7,774,167 B2 * | 8/2010 | Bregulla | ............ | G05B 23/0251 714/25 |
| 9,141,098 B2 * | 9/2015 | Sayyar-Rodsari | ..... | G05B 13/04 |
| 2003/0167265 A1 * | 9/2003 | Corynen | ................ | G06Q 10/04 |
| 2007/0156288 A1 * | 7/2007 | Wroblewski | ......... | G05B 13/042 700/266 |
| 2008/0108048 A1 * | 5/2008 | Bartee | .................. | G05B 13/048 703/11 |

(Continued)

FOREIGN PATENT DOCUMENTS

EP 2902857 A1 8/2015
WO WO 2017066350 A1 4/2017

OTHER PUBLICATIONS

Klose et al, "Orchestration Requirements for Modular process Plants in Chemical and Pharmaceutical industries", 2019, Wiley Online Library, Chem. Eng. Technol. 2019, 42, No. 11, pp. 2282-2291 (Year: 2019).*

*Primary Examiner* — Jason Lin
(74) *Attorney, Agent, or Firm* — Leydig, Voit & Mayer, Ltd.

(57) ABSTRACT

An engineering system for orchestration of an industrial plant includes: a modular plant to be orchestrated including at least one processor from a topology having: a process orchestration layer, and a plurality of modules. A portion of the plurality of modules are formed as at least one combined module. Each combined module of the at least one combined module has at least two different modules of the portion of the plurality of modules. The process orchestration layer controls the plurality of modules. The control by the process orchestration layer includes in-direct control of the portion of the plurality of modules via control of the at least one combined module.

12 Claims, 7 Drawing Sheets

(56) References Cited

U.S. PATENT DOCUMENTS

| | | | |
|---|---|---|---|
| 2008/0249641 A1 | 10/2008 | Enver et al. | |
| 2010/0131076 A1* | 5/2010 | Colombo | G06F 8/00 709/201 |
| 2015/0154496 A1* | 6/2015 | Martin | G06Q 10/00 706/11 |
| 2018/0041072 A1* | 2/2018 | Clifton | H02J 3/14 |
| 2021/0397146 A1* | 12/2021 | Halblaub | G05B 19/41885 |

* cited by examiner

ENGINEERING SYSTEM FOR ORCHESTRATION OF AN INDUSTRIAL PLANT

CROSS-REFERENCE TO PRIOR APPLICATION

Priority is claimed to European Patent Application No. EP 20 181 797.0, filed on Jun. 23, 2020, the entire disclosure of which is hereby incorporated by reference herein.

FIELD

The present invention relates to engineering systems for orchestration of an industrial plant.

BACKGROUND

Usually, the engineering of a modular plant consists of two stages: one to engineer the modules, which is project-independent, and a second to engineer the plant out of the modules, which is project-dependent. This is shown in FIG. 1

Thus, the automation architecture consists of two layers: one for the modules, and a second for the process orchestration layer. This is shown in FIG. 2

Today, the orchestration of a modular plant is carried in a straight forward way. The modules are chosen, the topology is created and afterwards the recipes are developed. The decision about which module to be taken for a certain plant is based on the engineer's knowledge and not on a module pool and the modules contained therein. Thus, if the engineer does not know that a certain module (or module type) is available, he might use modules that do not fit optimally into the plant—e.g. a module might produce a bottle-neck in the process flow.

In case the bottle-neck is identified later during production and should be solved, different approaches can be selected. The module producing the bottle-neck could be exchanged by another more capable module. This module might not have exactly the same interface as the smaller module. In order to use the new module then, the recipes where the module was used before, must be adapted. Depending on the number of recipes and the difference of the interface, this can be involve a considerable amount of time and effort.

There is a need to improve model development for industrial processes

SUMMARY

In an embodiment, the present invention provides an engineering system for orchestration of an industrial plant, comprising: a modular plant to be orchestrated comprising at least one processor from a topology comprising: a process orchestration layer, and a plurality of modules, wherein a portion of the plurality of modules are formed as at least one combined module, wherein each combined module of the at least one combined module comprises at least two different modules of the portion of the plurality of modules, wherein the process orchestration layer is configured to control the plurality of modules, and wherein the control by the process orchestration layer comprises in-direct control of the portion of the plurality of modules via control of the at least one combined module.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
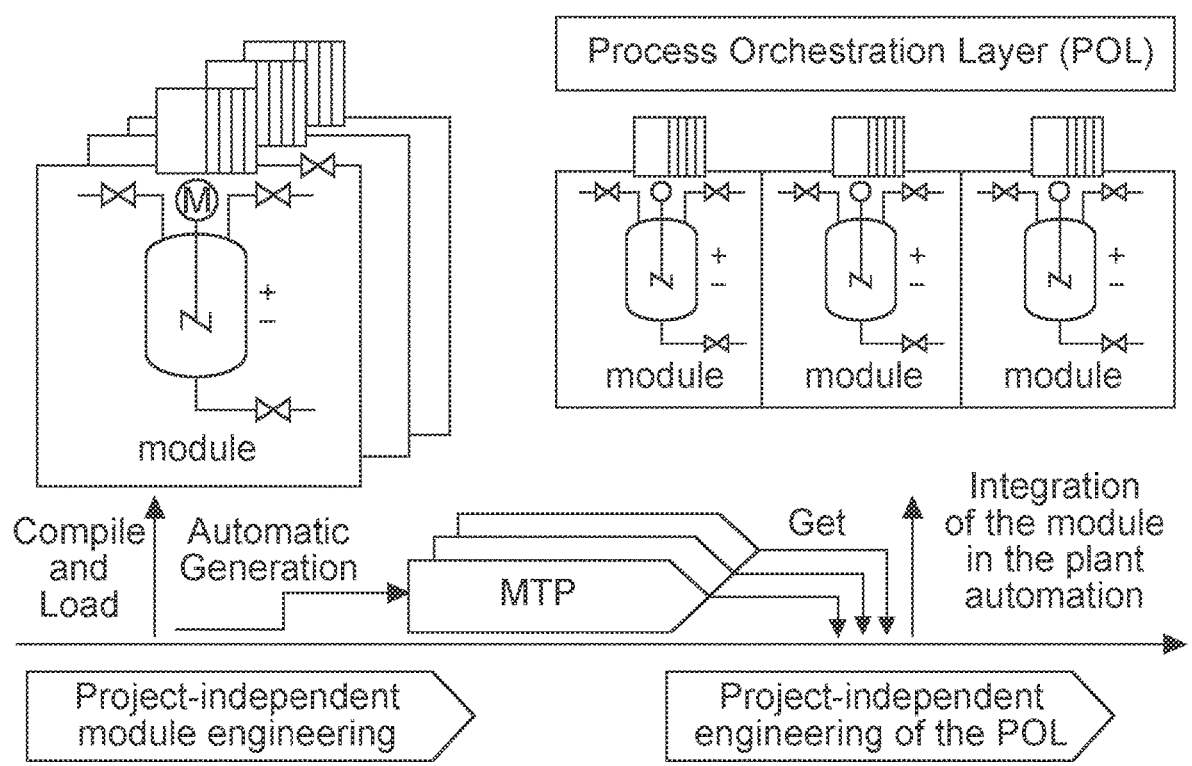
FIG. 1 shows an example of existing engineering of a modular plant in two stages.

In an embodiment, the present invention provides an improved technique to design and engineer a modular plant.

In a first aspect, there is provided an engineering system for orchestration of an industrial plant. A modular plant to be orchestrated is implemented by at least one processor from a topology comprising:

a process orchestration layer (POL); and
a plurality of modules;
  wherein, a portion of the plurality of modules are formed as at least one combined module, and wherein each combined module of the at least one combined module comprises at least two different modules of the portion of the plurality of modules; and
  wherein, the process orchestration layer is configured to control the plurality of modules, wherein the control by the process orchestration layer comprises in-direct control of the portion of the plurality of modules via control of the at least one combined module.

In an example, the control by the process orchestration layer comprises direct control of one or more modules of the plurality of modules that are not part of the portion of the plurality of modules that are formed as the at least one combined module.

In an example, the topology comprises at least one functional block. At least one module of the plurality of modules is associated with the at least one functional block to form at least one module type package. The control of the plurality of modules by the process orchestration layer can comprises in-direct control of the at least one module that is associated with the module type package.

In an example, the at least one processor comprises a plurality of processors. Different processors are configured to execute the at least one functional block and the at least one module associated with the at least one functional block.

In an example, one or more modules are associated with one or more functional blocks to form a module type package, and where the one or more functional blocks are utilized from a library of functional blocks.

In an example, the plurality of modules are configured to support material connection points and information and/or signal connection points.

In an example, the plurality of modules comprises one or more of: a position control module; a heating module; a dose module; a reactor module; a filter module, a mixing module.

In an example, the at least one functional block comprises one or more of; a logic block; a conversion block.

In an example, each module of the plurality of modules offers one or more services controllable from the process orchestration layer.

In a second aspect, there is provided an engineering system for orchestration of an industrial plant. A modular plant to be orchestrated is implemented by at least one processor from a topology comprising:
  a process orchestration layer;
  a plurality of modules; and
  at least one functional block.

At least one module of the plurality of modules is associated with the at least one functional block to form at least one module type package. The process orchestration layer is configured to control the plurality of modules. The control comprises in-direct control of the at least one module that is associated with the module type package.

In an example, one or more modules are associated with one or more functional blocks to form a module type package, and wherein the one or more functional blocks are utilized from a library of functional blocks.

In an example, a portion of the plurality of modules are formed as at least one combined module. Each combined module of the at least one combined module comprises at least two different modules of the portion of the plurality of modules. The process orchestration layer is configured to control the plurality of modules. The control by the process orchestration layer comprises in-direct control of the portion of the plurality of modules via control of the at least one combined module.

In an example, the control by the process orchestration layer comprises direct control of one or more modules of the plurality of modules that are not part of the portion of the plurality of modules that are formed as the at least one combined module.

In an example, the at least one processor comprises a plurality of processors. Different processors are configured to execute the at least one functional block and the at least one module associated with the at least one functional block.

In an example, the plurality of modules are configured to support material connection points and information and/or signal connection points.

In an example, the plurality of modules comprises one or more of: a position control module; a heating module; a dose module; a reactor module; a filter module, a mixing module.

In an example, the at least one functional block is configured to support a signal port.

In an example, the at least one functional block comprises one or more of; a logic block; a conversion block.

In an example, each module of the plurality of modules offers one or more services controllable from the process orchestration layer.

The above aspects and examples will become apparent from and be elucidated with reference to the embodiments described hereinafter.

FIGS. 3-8 relate to engineering systems for orchestration of an industrial plant.

An example of an engineering system for orchestration of an industrial plant is described as follows. A modular plant to be orchestrated is implemented by at least one processor from a topology comprising:
  a process orchestration layer (POL); and
  a plurality of modules;
  wherein, a portion of the plurality of modules are formed as at least one combined module, and wherein each combined module of the at least one combined module comprises at least two different modules of the portion of the plurality of modules; and
  wherein, the process orchestration layer is configured to control the plurality of modules, wherein the control by the process orchestration layer comprises in-direct control of the portion of the plurality of modules via control of the at least one combined module.

Figure 2:
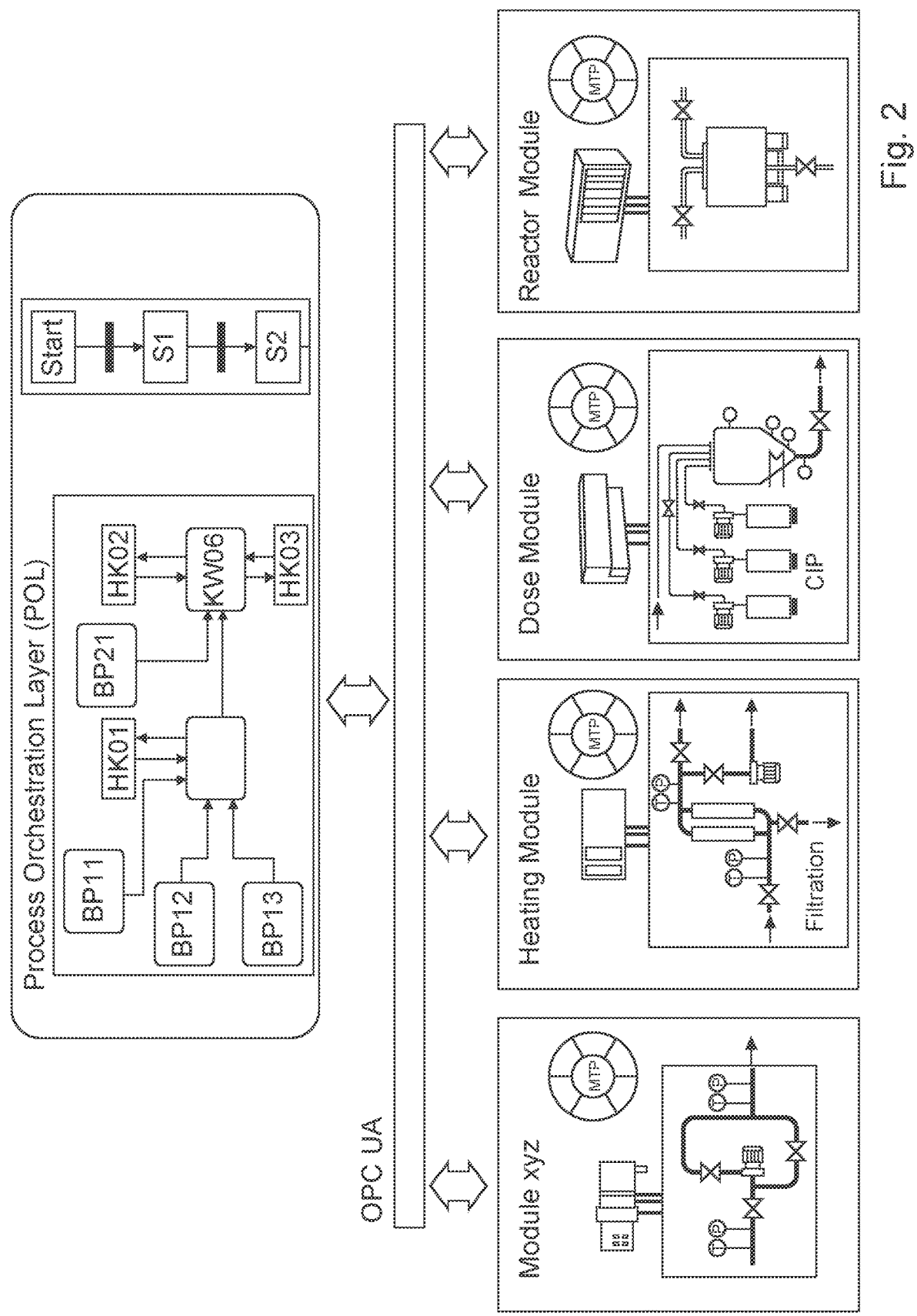
FIG. 2 shows an example of an existing modular architecture with module layer and process orchestration layer (where an example topology and recipe are shown in the POL)

Thus, rather than the existing two layer modular architecture as shown in FIG. 2, a new two layer architecture can be formed from a POL layer and a layer of combined module(s), or a new three layer architecture can be formed from a POL layer and a layer of combined module(s) and the POL layer and a layer of modules.

Figure 3:
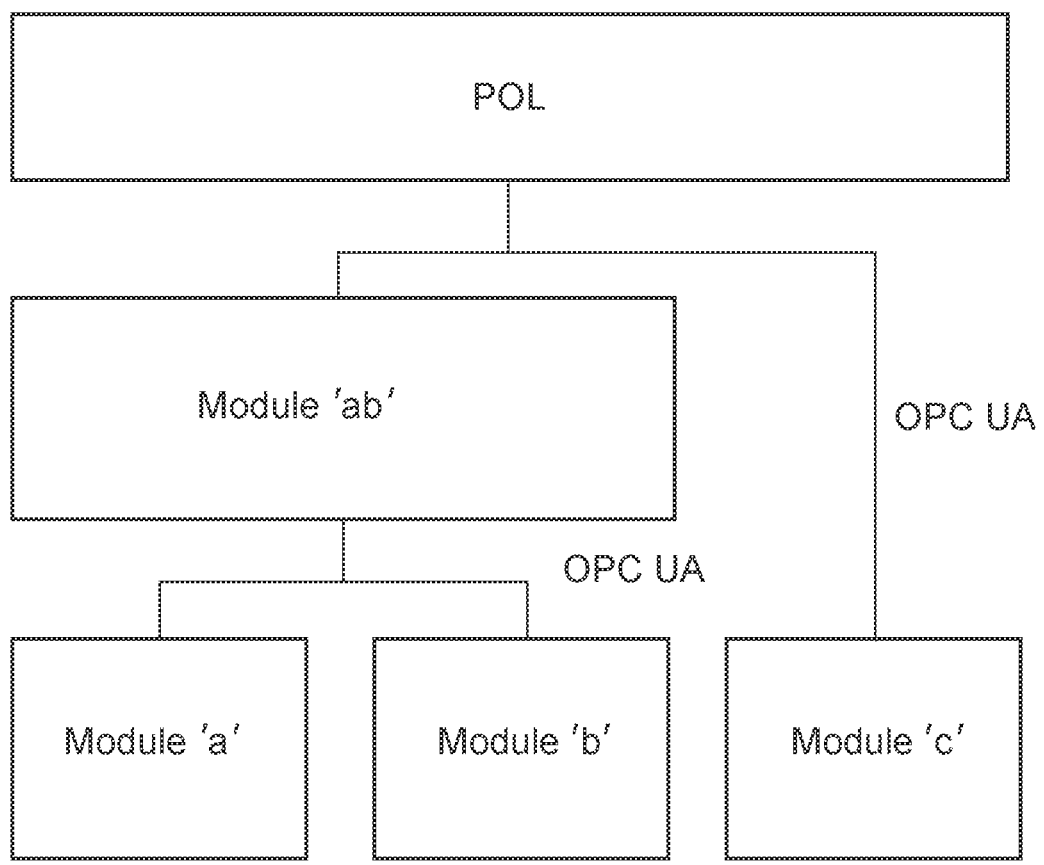
FIG. 3 shows an example of the new modular architecture with optional middle layer with combined modules.
Figure 5:
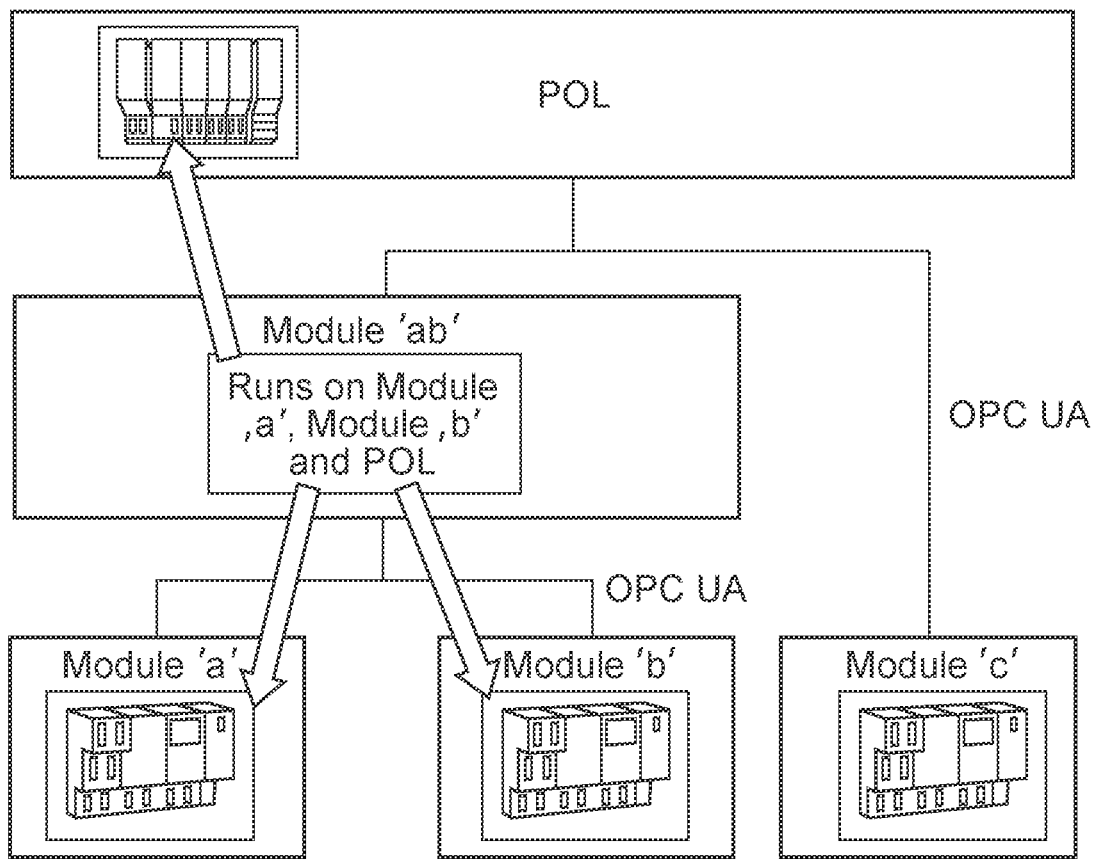
FIG. 5 shows an example of the new modular architecture with hardware components.
Figure 7:
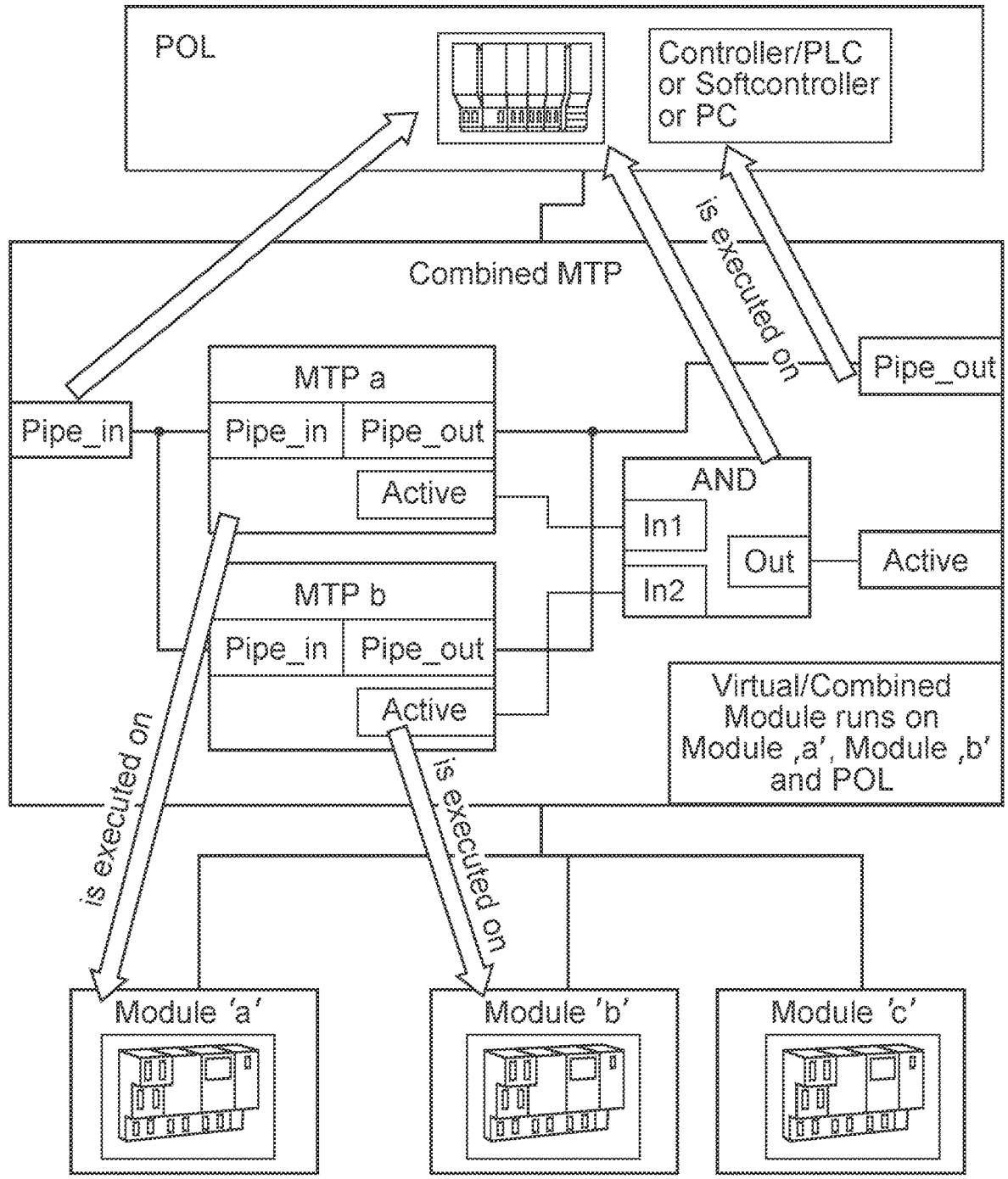
FIG. 7 shows an example of a modular architecture with the new combined module of FIG. 6.

This is shown in detail in FIGS. 3, 5, and 7. The three layers shown in these figures are only for structuring. So for the user it looks like three layers. However, from a hardware perspective, it is still two layers (the modules and POL) as the different parts from the middle layer combined MTP layer are either being executed in the modules or in the POL:

The signal connection/forwarding (connections between the modules as well as the functional blocks) are also being executed in the POL (as visualized by thin black arrows in FIG. 7).

In an example, all of the plurality of modules are comprised in the form of combined modules.

In an example, the process orchestration layer is configured to directly control one or more modules of the plurality of modules.

According to an example, the control by the process orchestration layer comprises direct control of one or more modules of the plurality of modules that are not part of the portion of the plurality of modules that are formed as the at least one combined module.

According to an example, the topology comprises at least one functional block. At least one module of the plurality of modules is associated with the at least one functional block to form at least one module type package (MTP). The control of the plurality of modules by the process orchestration layer can comprises in-direct control of the at least one module that is associated with the module type package.

Thus, rather than the existing two layer modular architecture as shown in FIG. 2, a new two layer architecture can be formed from a POL layer and a layer of combined module(s) and MTP(s), or a new three layer architecture can be formed from a POL layer and a layer of combined module(s) and MTP(s) and the POL layer and a layer of modules.

In an example, all of the plurality of modules are comprised in the form of combined modules and in the form of modules associated with functional blocks.

In an example, the process orchestration layer is configured to directly control one or more modules of the plurality of modules.

According to an example, the at least one processor comprises a plurality of processors. Different processors are configured to execute the at least one functional block and the at least one module associated with the at least one functional block. Thus, a first processor can the at least one functional block and a second processor can execute the at least one module associated with that at least one functional block.

According to an example, one or more modules are associated with one or more functional blocks to form a module type package, and where the one or more functional blocks are utilized from a library of functional blocks. In other words, function block types that already exist in the library can be reused for the later controller, where the function blocks will be executed.

According to an example, the plurality of modules are configured to support material connection points and information and/or signal connection points Thus, the plurality of modules are configured to support pipe ports and signal ports for example.

According to an example, the plurality of modules comprises one or more of: a position control module; a heating module; a dose module; a reactor module; a filter module, a mixing module. The modules can comprise other module types as utilized in an industrial environment.

According to an example, the at least one functional block comprises one or more of; a logic block; a conversion block. The functional blocks can comprise other functional blocks.

According to an example, the at least one functional block comprises one or more of; a logic block; a conversion block.

According to an example, each module of the plurality of modules offers one or more services controllable from the process orchestration layer.

An example of an engineering system for orchestration of an industrial plant is described as follows. A modular plant to be orchestrated is implemented by at least one processor from a topology comprising:

a process orchestration layer (POL);
a plurality of modules; and
at least one functional block.

At least one module of the plurality of modules is associated with the at least one functional block to form at least one module type package (MTP). The process orchestration layer is configured to control the plurality of modules. The control comprises in-direct control of the at least one module that is associated with the module type package.

Thus, rather than the existing two layer modular architecture as shown in FIG. 2, a new two layer architecture can be formed from a POL layer and a layer of MTP(s), or a new three layer architecture can be formed from a POL layer and a layer of MTP(s) and the POL layer and a layer of modules.

This is shown in detail in FIGS. 3, 5, and 7. The three layers shown in these figures are only for structuring. So for the user it looks like three layers. However, from a hardware perspective, it is still two layers (the modules and POL) as the different parts from the middle layer combined MTP layer are either being executed in the modules or in the POL:

The signal connection/forwarding (connections between the modules as well as the functional blocks) are also being executed in the POL (as visualized by thin black arrows in FIG. 7).

In an example, all of the plurality of modules are comprised in the form of modules associated with functional blocks.

In an example, the process orchestration layer is configured to directly control one or more modules of the plurality of modules.

According to an example, one or more modules are associated with one or more functional blocks to form a module type package, and wherein the one or more functional blocks are utilized from a library of functional blocks. Thus, function block types that already exist in the library can be reused for the later controller, where the function blocks will be executed.

According to an example, a portion of the plurality of modules are formed as at least one combined module. Each combined module of the at least one combined module comprises at least two different modules of the portion of the plurality of modules. The process orchestration layer is configured to control the plurality of modules. The control by the process orchestration layer comprises in-direct control of the portion of the plurality of modules via control of the at least one combined module.

Thus, rather than the existing two layer modular architecture as shown in FIG. 2, a new two layer architecture can be formed from a POL layer and a layer of combined module(s) and MTP(s), or a new three layer architecture can be formed from a POL layer and a layer of combined module(s) and MTP(s) and the POL layer and a layer of modules.

In an example, all of the plurality of modules are comprised in the form of combined modules and in the form of MTPs.

In an example, the process orchestration layer is configured to directly control one or more modules of the plurality of modules.

According to an example, the control by the process orchestration layer comprises direct control of one or more modules of the plurality of modules that are not part of the portion of the plurality of modules that are formed as the at least one combined module.

According to an example, the at least one processor comprises a plurality of processors. Different processors are configured to execute the at least one functional block and the at least one module associated with the at least one functional block. Thus, a first processor can the at least one functional block and a second processor can execute the at least one module associated with that at least one functional block.

According to an example, the plurality of modules are configured to support material connection points and information and/or signal connection points. Thus, the plurality of modules are configured to support pipe ports and signal ports for example.

According to an example, the plurality of modules comprises one or more of: a position control module; a heating module; a dose module; a reactor module; a filter module, a mixing module. The modules can comprise other module types as utilized in an industrial environment.

According to an example, the at least one functional block is configured to support a signal port.

According to an example, the at least one functional block comprises one or more of; a logic block; a conversion block. The functional blocks can comprise other functional blocks.

According to an example, each module of the plurality of modules offers one or more services controllable from the process orchestration layer.

The engineering systems for orchestration of an industrial plant are now described in further detail with respect to specific detailed embodiments, where reference is again made to FIGS. 3-8.

The new engineering system for orchestration of an industrial plant can have multiple functionality, and therefore can be considered to be systems, and these in effect comprise three parts:

1. Topology consisting out of modules and function blocks (mixed logic in one diagram).

2. Module logic and function blocks being executed on different hardware (typically, might not be the case for virtual modules).

3. Module(s) plus function blocks forming a new MTP which can be used in the orchestration system For the engineering of a new combined module, the topology diagram can exist out of module instances as well as of function blocks. The modules and function blocks can be connected via ports. The modules support ports for material (pipe) as well information (signal) where the function blocks support signal ports. By combining all blocks in one diagram, the user gets a good overview over the resulting logic.

The execution of the different block types (modules and function blocks) can be realized by different hardware. For example, the module logic is executed on the module controller, while the additional function blocks are executed on a controller or a soft controller within the POL or an OPC UA Gateway running on a PC.

While running on different locations, the logic is executed as if it is running within one module. Once the combined module is engineered and downloaded (e.g. to a controller in the POL plus the normal module logic), the module can be controlled by services from the POL like any other module.

Thus, a new service can use simply a preconfigured service from an underlying module. A service can be specialized for certain needs, and can then be more easily engineered in the POL. In this way, a service that is very flexible (and thus has lots of parameters) can be made easier to use by making one or more specialized services out of them. They can also be specialized in that respect, in that a module (which is for example broken or needs to be repaired) where a service is used in the plant can be replaced easily by another module that offers this flexible service. This flexibility can be pre-parameterized to form a new service that exactly matches the service from the broken module. Thus, the broken module can be replaced with the new module by having the same service-signature (same service parameters and it could even have the same service name). This mimics a concept in software engineering termed "Facade" (used for software-classes), where the newly (virtual) service changes its outer look, while the inner part stays the same.

Thus the new developments here ease the module exchange, where benefits are gained because it is possible to create a new service from a similar module (that originally does not provide the same service), which matches the old (previously used service). In the recipe where this service was used before, the new service could then be used without a need of adapting the recipe within the POL.

Regarding topology, the engineering of these combined modules is different to the one from the normal modular engineering workflow. In between the module layer at the bottom and the POL at the top, another layer is "squeezed in"—the combined modules layer. Within this optional layer, modules can be enriched by function blocks and/or combined with other modules. The POL can then orchestrate both, the combined modules as well normal modules together. In case a module is combined with another module and forms a new combined module as shown in FIG. 3 for module 'a' and 'b', these modules should not be controlled directly by the POL any more as this could lead to conflicts with the combined module. Modules, that are not combined with other modules or enriched with function blocks, can be normally be orchestrated as before as shown for module 'c'.

Figure 4:
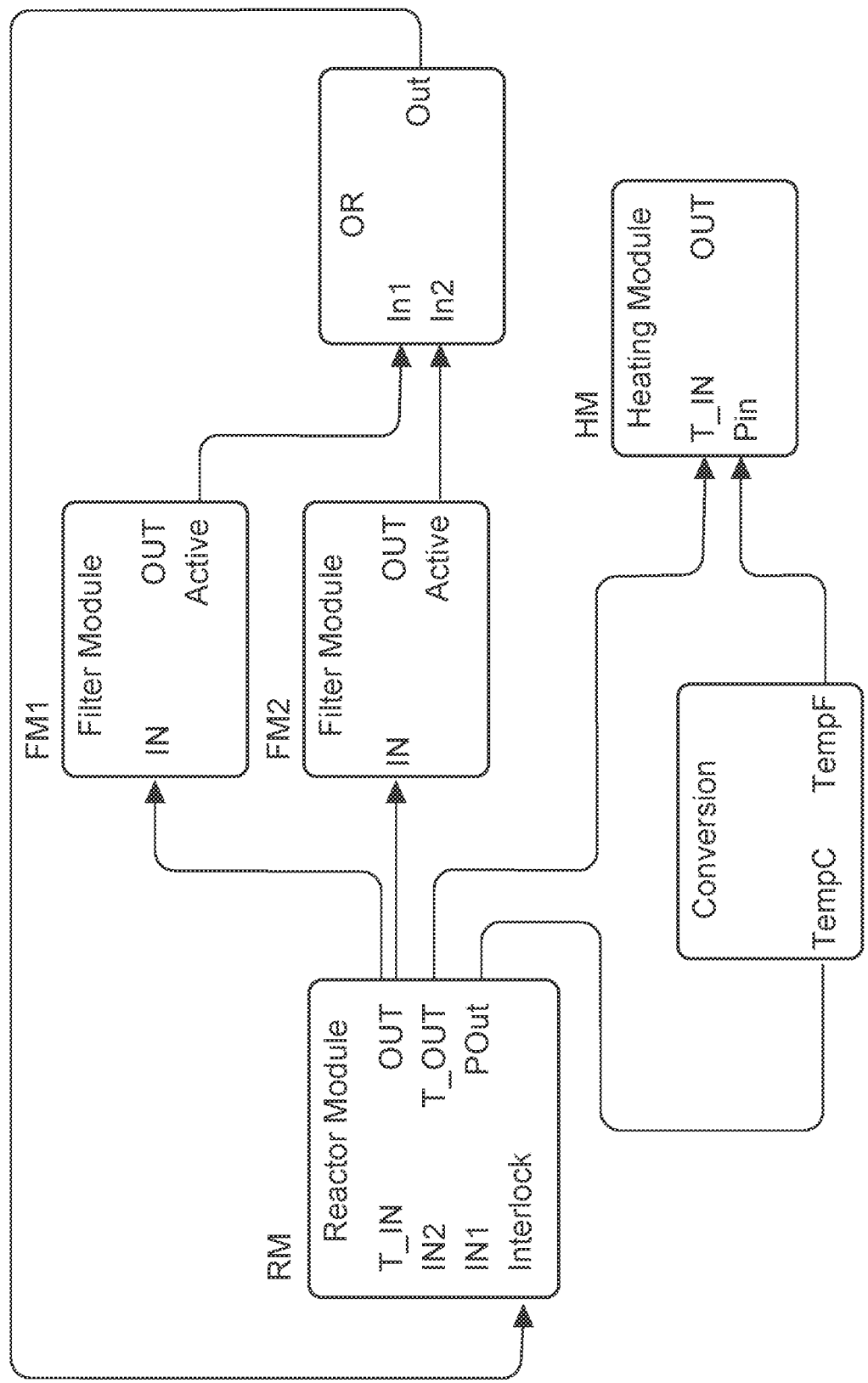
FIG. 4 shows an example of the new topology consisting of four modules (RM, FM1, FM2 and HM) and two function blocks (Conversion, and OR), material connections are shown going from RM to FM1, FM2 and HM (pipes) and information connections are shown going from RM to Conversion, from Conversion to HM, from FM1 and FM2 to OR and from OR to RM (signals)

An alternative of adding a third layer (in the middle) for combined modules, the topology that is engineered in the POL can be enriched by function blocks as shown in FIG. 4. In this case this topology finds particular utility for a larger plant, and where a new module can be formed out of it as described in the section before as shown in FIG. 3 and form this middle layer.

One specialty of this approach is to reuse function block types that already do exist in the library for the later controller, where the function blocks will be executed. In this case this can be the AC800M-controller, which has the Control Builder M as an engineering tool. The libraries that were developed for that controller can be exported into some xml-file with just the following data:

Function block type name and library name (to find the correct block later on for code generation)

Ports

Input or output (→place at right or left side of the block)

Name of the port

Data type of the port (to check what connections are possible)

These blocks (in the engineering tool) do not contain any inner logic—they are just black boxes. They can be connected in the topology similar as in diagrams within the Control Builder M. When generating the control code for the combined MTP, real function blocks within the Control Builder M will be instantiated that contain the correct logic. For this code generation, the library name, function block type name and the connection of the ports are needed.

With respect to execution, the different parts that form the topology, the modules and function blocks, can be executed on different hardware, where the different modules are executed within different controllers, where the above described "middle layer" is provided in order to structure the plant further. However, the new MTP is formed consisting out of modules and logic running in the POL as shown in FIG. 5.

The newly formed MTP needs the connections in the topology as well as services/procedures and parameters so that it can be controlled in an orchestration environment.

Figure 6:
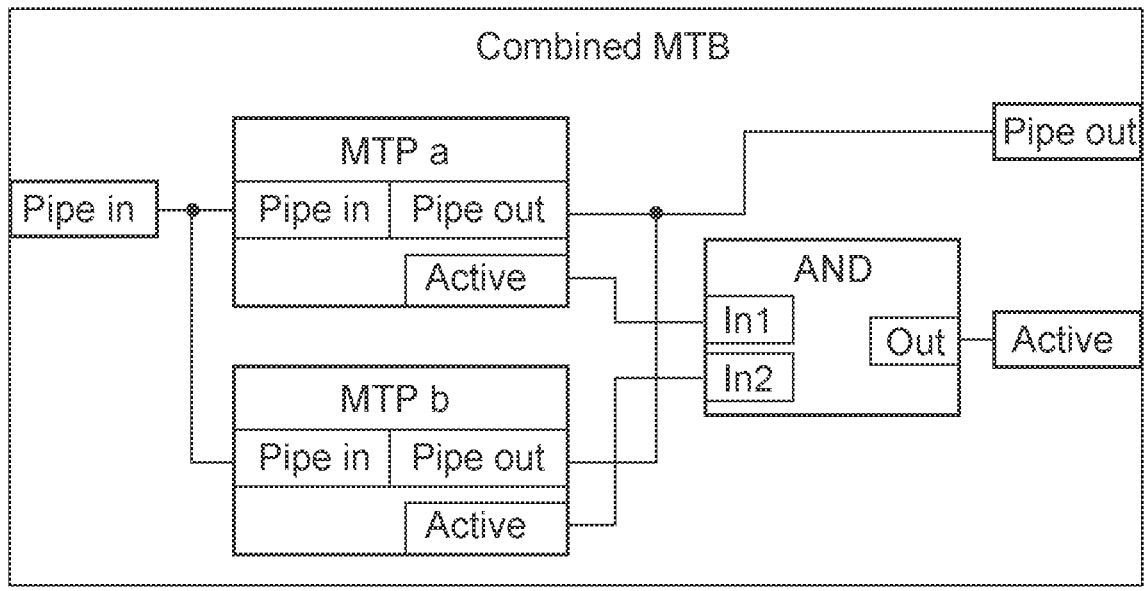
FIG. 6 shows an example of a new combined module consisting of one or more physical modules plus one or more logic function blocks.

In a situation where a module is required to be replaced by another module or a module in parallel should be added, the interface of the resulting topology should ideally be the same as before. FIG. 6 shows the use case of replacing 'MTP a' with a construct of 'MTP a' and 'MTP b' running in parallel. In order to support the user, the interface, here the connections to 'Pipe_in', 'Pipe_out' and 'Active' can already be placed on the very right and left side of the diagram. They are taken from 'MTP a' as this is the interface of that Module. However now, the interface is kept stable for a module exchange and surrounding function blocks running in the POL are used to achieve this.

As the services from 'MTP a' may not be able to run as before in the case of the combined MTP, and in such a situation the new services have to be engineered. Also here, the interface can be the same, which means the number of services and service names are the same and also the needed service parameters are the same.

Number of services, service names,

Strategies for the services, self-completing or continuous strategy

Figure 8:
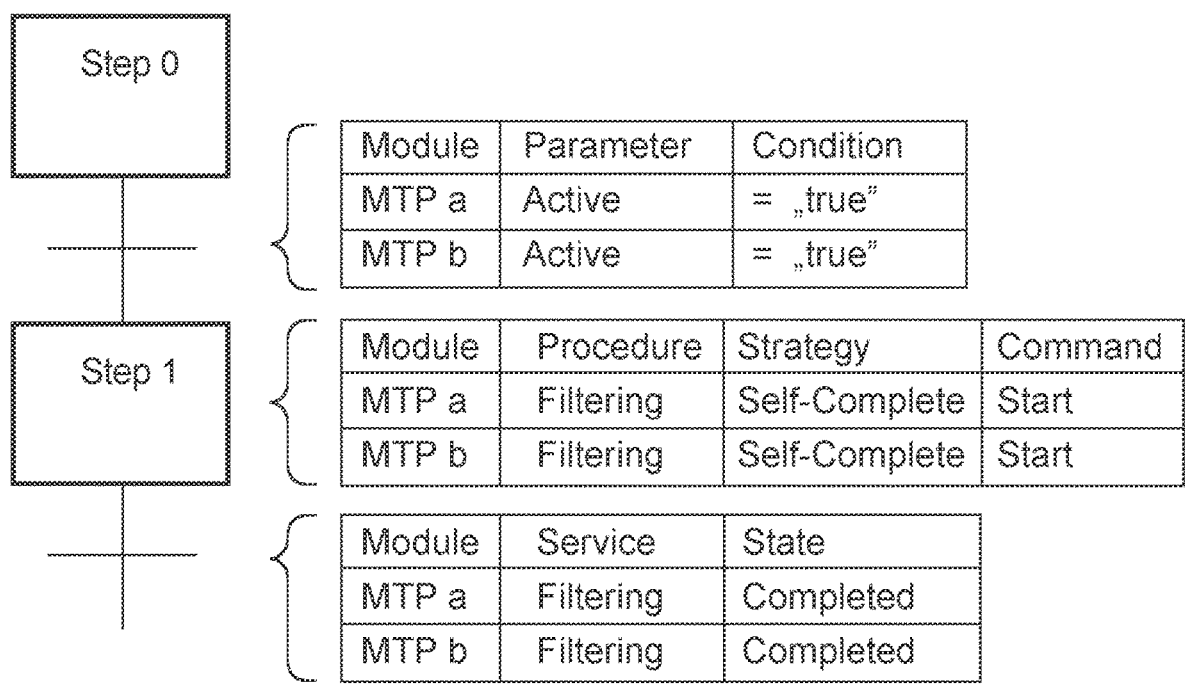
FIG. 8 shows an example of a recipe controlling an example of a new combined module and thus offering a new service.

Strategy parameters: same number, names, data types, units and minimum and maximum range This can be prepared as a skeleton for the user so that he can fill out the inner logic for every service. The inner logic for a service can be engineered using the recipe editor as shown in FIG. 8. Here, the services of the inner modules can be connected to form a new service.

In the combined/virtual module, new services are engineered that make use of the services from the underlying modules. These new services can be programmed similar to the existing services, as shown in FIG. 8.

Examples for combining services are the following:
Combining features (different module types):
Heating module offering a heating service
Reactor module offering: Mixing, Filling, Emptying
→combined Service: Heated Mixing
Redundant module (could be two modules of same type or similar type):
Combination of two modules with similar/same services
Combined service makes sure that one of the services from the underlying modules is triggered (checks availability . . . )
E.g. filter serive where from now and then a filter needs to be replaced→filter can be replaced for one module while the other module takes over the load
Bottleneck-solver/scale-up (could be two modules of same type or similar type):
Similar use-case as redundant module but instead of having focus on availability→focus on throughput
Two modules with similar/same services are combined to increase the through-out of a modular plant
Combined service controls both relevant services from underlying modules, might have some intelligence to work with reduced performance in case one module is not functioning
Finally, the new MTP is then generated so that it can be used in the POL just like any other module.
For the HMI-aspect, the following is done:
One new overall HMI is generated based on the newly engineered topology (e.g. FIG. 6). In addition, the HMIs of the single modules are taken as they are and transferred to the new MTP. The MTP supports an HMI-structure. Here, the HMIs of the single MTPs are placed underneath the newly generated HMI.
Communication:
For the communication, the new services are called via the new combined module and therefore another OPC UA server has to be used than for the modules. Here, the server of the AC800M can be used. As several newly combined modules can be created, the server should be able to support this.
Services:
The services are located in the combined module as described. Underneath, the services of the single modules are used and therefore the information of the MTPs must be available.
The information of the single MTPs can be embedded in the newly generated MTP as additional information. Alternatively or in addition, the engineering data is used (and sufficient) similar as generating the orchestration logic for the POL before.
Use Cases
In the situation of a module exchange or the addition of a redundant or second module in parallel, it is beneficial, that the recipe does not need to be adapted. But in order to run the same recipe, the module name, services and parameters need to be the same. This might be achieved by adding surrounding logic to the module. Services and parameters can be renamed by this, for example. New services can be added by pre-configuring existing services. Self-completing services can be added by adding a timer (or other termination condition) to a continuous service. Also, mathematical operations can be done to recalculate units.

Another approach to solve a bottle-neck is to add another module of the same or similar type in parallel to the existing module. In this situation the recipe should stay the same, also here adaptions to the interface should be made. The two modules are then combined in that way, that the interface of the one module from before is realized.

As discussed above, a new development is to create virtual modules that consist of a real module plus some added functions. The real plus the added functions could then be summarized in a new MTP that can be used in the POL like a normal module.

In this way technical developments are provided that are relevant in the context of engineering an industrial modular plant, with ease of module exchange provided by functions running in the POL. In a situation where a module should be exchanged by another module within a modular plant, previously this other might not fit 100% to the predecessor module. However, with the new development, with the help of function running in the POL, the module could be "wrapped" so that the interface is the same to the predecessor module. Also, if a module lacks a self-completing service, based on a continuous service, a self-completing service could be offered by using an external timer and wrapping it with the module so that a new self-completing service can be offered to the POL.

Overall, the benefit is that a module can be used in a more flexible way. A Module-exchange can be done easier as the new module can be fitted to the same interface as the old module. Thus, the recipe can be used as before and does not need to be adapted.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An engineering system for orchestration of an industrial plant, comprising:
   wherein, a modular plant to be orchestrated comprising at least one processor from a topology comprising:
   a process orchestration layer,
   a plurality of modules, and
   at least one functional block, wherein the plurality of modules are configured to support material connection points and information and/or signal connection points,
wherein the at least one functional block comprises one or more of: a logic block, a conversion block,
wherein a portion of the plurality of modules are formed as at least one combined module,
wherein each combined module of the at least one combined module comprises at least two different modules of the portion of the plurality of modules,
wherein the process orchestration layer is configured to control the plurality of modules,
wherein the control by the process orchestration layer comprises indirect control of the portion of the plurality of modules via control of the at least one combined module,
wherein the control by the process orchestration layer comprises direct control of one or more modules of the plurality of modules that are not part of the portion of the plurality of modules that are formed as the at least one combined module,
wherein at least one module of the plurality of modules is associated with the at least one functional block to form at least one module type package,
wherein an information and/or signal connection output from one or more modules forms input to a functional block, and
wherein the control of the plurality of modules by the process orchestration layer comprises indirect control of the at least one module that is associated with the module type package.

2. The engineering system of claim 1, wherein the at least one processor comprises a plurality of processors, and
wherein different processors of the plurality of processors are configured to execute the at least one functional block and the at least one module associated with the at least one functional block.

3. The engineering system of claim 1,
wherein the at least one functional block is utilized from a library of functional blocks.

4. The engineering system of claim 1, wherein the plurality of modules comprises one or more of:
a position control module;
a heating module;
a dose module;
a reactor module;
a filter module;
a mixing module.

5. The engineering system of claim 1, wherein each module of the plurality of modules offers one or more services controllable from the process orchestration layer.

6. An engineering system for orchestration of an industrial plant, comprising:
a modular plant to be orchestrated comprises at least one processor from a topology comprising:
a process orchestration layer,
a plurality of modules, and
at least one functional block,
wherein the plurality of modules are configured to support material connection points and information and/or signal connection points,
wherein the at least one functional block comprises one or more of: a logic block, a conversion block,
wherein at least one module of the plurality of modules is associated with the at least one functional block to form at least one module type package,
wherein the process orchestration layer is configured to control the plurality of modules, and
wherein the control comprises indirect control of the at least one module that is associated with the module type package,
wherein the control by the process orchestration layer comprises direct control of one or more modules of the plurality of modules that are not part of the portion of the plurality of modules that are formed as the at least one combined module,
wherein an information and/or signal connection output from one or more modules forms input to a functional block, and
wherein the control of the plurality of modules by the process orchestration layer comprises indirect control of the at least one module that is associated with the module type package.

7. The engineering system of claim 6, wherein one or more modules are associated with one or more functional blocks to form a module type package, and
wherein the one or more functional blocks are utilized from a library of functional blocks.

8. The engineering system of claim 6, wherein a portion of the plurality of modules are formed as at least one combined module,
wherein each combined module of the at least one combined module comprises at least two different modules of the portion of the plurality of modules,
wherein the process orchestration layer is configured to control the plurality of modules, and
wherein the control by the process orchestration layer comprises indirect control of the portion of the plurality of modules via control of the at least one combined module.

9. The engineering system of claim 6, wherein the at least one processor comprises a plurality of processors, and
wherein different processors of the plurality of processors are configured to execute the at least one functional block and the at least one module associated with the at least one functional block.

10. The engineering system of claim 6, wherein the plurality of modules comprises one or more of:
a position control module;
a heating module;
a dose module;
a reactor module;
a filter module;
a mixing module.

11. The engineering system of claim 6, wherein the at least one functional block is configured to support a signal port.

12. The engineering system of claim 6, wherein each module of the plurality of modules offers one or more services controllable from the process orchestration layer.

* * * * *